United States Patent [19]

Cooper

[11] Patent Number: 5,308,634
[45] Date of Patent: May 3, 1994

[54] ESTERIFIED POLYOXYALKYLENE BLOCK COPOLYMERS AS REDUCED CALORIE FAT SUBSTITUTES

[75] Inventor: Charles F. Cooper, Paoli, Pa.

[73] Assignee: Arco Chemical Technology, L.P., Wilmington, Del.

[21] Appl. No.: 1,016

[22] Filed: Jan. 6, 1993

Related U.S. Application Data

[63] Continuation of Ser. No. 597,908, Oct. 15, 1990, abandoned.

[51] Int. Cl.$^5$ ............................................. A23L 1/00
[52] U.S. Cl. .................... 426/531; 426/601; 426/603; 426/611
[58] Field of Search ............... 426/601, 611, 531, 311, 426/603, 606, 611, 612, 656, 658; 536/18.3; 554/161, 162, 163, 164, 165, 168, 169, 172

[56] References Cited

U.S. PATENT DOCUMENTS

| | | |
|---|---|---|
| 2,610,125 | 9/1952 | Valko ........................... 99/123 |
| 2,908,681 | 10/1959 | Anderson et al. |
| 3,337,595 | 8/1967 | Lamont et al. |
| 3,435,024 | 3/1969 | Nobile et al. |
| 3,655,645 | 11/1972 | Jacques. |
| 4,022,808 | 5/1977 | Yoshihara et al. |
| 4,115,415 | 9/1978 | Yoshihara et al. |
| 4,464,182 | 8/1984 | Tack et al. |
| 4,600,539 | 7/1986 | Hoppe et al. |
| 4,614,622 | 9/1986 | Huettinger et al. |
| 4,687,843 | 8/1987 | Smolin et al. |
| 4,783,332 | 11/1988 | Schreuder ........................... 424/59 |
| 4,849,242 | 7/1989 | Kershner ........................... 426/601 |
| 4,861,613 | 8/1989 | White et al. ........................... 426/611 |
| 4,895,681 | 1/1990 | Herrmann et al. ............... 260/410.6 |
| 4,952,413 | 8/1990 | LaBarge et al. |
| 4,959,169 | 9/1990 | McGraw et al. ........................... 252/68 |
| 4,983,329 | 1/1991 | Cooper. |
| 5,059,443 | 10/1991 | Ennis et al. ........................... 426/531 |
| 5,175,323 | 12/1992 | Cooper ........................... 554/164 |

FOREIGN PATENT DOCUMENTS

| | | |
|---|---|---|
| 564516 | 10/1958 | Canada. |
| 396405 | 7/1990 | European Pat. Off. |
| 396406 | 7/1990 | European Pat. Off. |
| 415635 | 3/1991 | European Pat. Off. |
| 433016 | 6/1991 | European Pat. Off. |
| 1595369 | 4/1970 | Fed. Rep. of Germany. |
| 207070 | 2/1984 | Fed. Rep. of Germany. |
| 55-79313 | 6/1980 | Japan. |
| 55-160710 | 12/1980 | Japan. |
| 976289 | 11/1964 | United Kingdom. |
| 2129004 | 5/1984 | United Kingdom. |

OTHER PUBLICATIONS

*McGraw-Hill Dictionary of Scientific and Technical Terms*-Fourth Edition pp. 921 and 1088.
Aust et al., "Orientational Studies on the Metabolism of Various Acaloric Compounds . . . ", Die Nahrung, vol. 32, No. 1, pp. 49-57 (1988).

*Primary Examiner*—Donald E. Czaja
*Assistant Examiner*—Leslie Wong
*Attorney, Agent, or Firm*—Stephen D. Harper

[57] ABSTRACT

Esterified polyoxyalkylene block copolymers are useful as reduced calorie fat substitutes in food compositions due to their resistance to enzymatic hydrolysis and absorption upon ingestion. The fat mimetics contain hydrophilic polyoxyalkylene inner blocks which tend to promote thickening or gelling of the composition when mixed with a minor amount of water, thereby lessening problems with anal leakage and short bowel transit times.

17 Claims, No Drawings

ESTERIFIED POLYOXYALKYLENE BLOCK COPOLYMERS AS REDUCED CALORIE FAT SUBSTITUTES

This is a continuation of application Ser. No. 07/597,908, filed Oct. 15, 1990, now abandoned.

FIELD OF THE INVENTION

This invention relates to esterified polyoxyalkylene block copolymers useful as fat mimetics in food compositions. The esterified polyoxyalkylene block copolymers have good organoleptic characteristics and physical properties resembling those of naturally occurring edible oils and fats, but are substantially non-digestible and hence suitable for reducing the available caloric content of a food composition without altering the expected mouth feel and consistency of the composition. The fat mimetics of this invention have the further advantage of minimizing the problems with anal leakage which can sometimes occur when other types of non-digestible or non-absorbable fat substitutes are introduced at high dietary levels.

BACKGROUND OF THE INVENTION

The accumulation of medical evidence in recent years regarding the adverse health implications of high fat diets, principally heart attacks, arteriosclerosis and obesity, has caused consumers to become extremely concerned about their diets. It is estimated that between 70–80% of U.S. adult females follow a weight reducing diet at least once a year. Men are also concerned about their weight and cholesterol levels.

Common obesity is currently one of the most prevalent metabolic problems in the general population. Fats and oils are necessary for balanced nutrition. However, the average consumer simply consumes more than is needed for proper nutrition. It is estimated that lipids constitute about 40% of the total calories in the typical western diet. Fats are consumed directly in meats, spreads, salad oils, and in natural produce such as nuts and avocados. Fats and oils are also consumed as a result of absorption or incorporation in foods during baking and frying. The sharp increase in consumption of fast foods is a major contributor to the increase in the amount of dietary fat since fast foods rely extensively on frying processes employing fats and oils. In addition, the snack food industry uses large amounts of fats and oils in the production of potato chips, corn chips and other snack items.

It is clear that there is an enormous potential market for a fat substitute or fat mimetic that is substantially non-digestible or has reduced caloric value. Replacement of fats in the diet with non-caloric substitutes is a more efficient way of reducing caloric intake than replacing sugar or carbohydrates because, gram for gram, the substitution of non-caloric fat substitutes is more than twice as effective as reducing carbohydrate content with substances such as saccharine or aspartame.

One of the difficulties in eliminating fat from the diet is the fact that fats and oils are all-pervasive in food products. In part, this is because they play an important role in the organoleptic acceptability of food products. Generally speaking, a fat substitute providing fewer calories than a conventional triglyceride must be non-digestible, that is, not hydrolyzed in the digestive tract. In addition, it should not be directly absorbed through the intestinal wall. While some types of fat substitutes may be non-digestible, they are not of sufficiently high molecular weight to prevent them from being absorbed through the intestinal wall. The threshold molecular weight of non-absorbability for lipophilic molecules appears to be about 600.

In addition, the fat substitute must itself be non-toxic at high levels of ingestion. It must contain no toxic residues or impurities. To the extent that a fat substitute may be partially hydrolyzed in the digestive tract, any hydrolysis products must be non-toxic and/or metabolizable. If metabolizable, they should have very low caloric value. In general, fat substitutes must be without any serious physiological side effects.

The fat substitutes must also have good organoleptic qualities of mouth feel and must not unacceptably alter the taste of a food composition. In addition, fat substitutes must have appropriate physical properties for use in food compositions. For example, they should be liquids or solids depending on whether they are to be used as oil or shortening substitutes and, where used for cooking, must be thermally stable.

A prominent disadvantage of certain of the non-digestible or non-absorbable fat substitutes which have been developed to date is the tendency for such substances to promote an undesired laxative effect when ingested at relatively high levels in the diet. Since these fat substitutes are not altered by or removed from the gastrointestinal tract, they remain in an oil-like physical state and thus tend to promote anal leakage or short bowel transit times due to their lubricant properties and general immiscibility with the aqueous components of the diet. This problem has been addressed in the past by using "anti-anal leakage agents" in combination with the fat substitute. Such anti-anal leakage agents (e.g., silica, cellulose fiber) may undesirably alter the mouth feel and organoleptic properties of the food composition, however.

It is apparent, therefore, that there is a need for an improved low calorie edible oil substitute that has the properties of a triglyceride oil when formulated into food compositions but which is altered upon ingestion to a less "oil-like" physical state and which does not need to be used in conjunction with an anti-anal leakage agent. A fat substitute having these characteristics would likely enjoy greater consumer acceptance than many of the currently known mimetics.

SUMMARY OF THE INVENTION

This invention provides a fat mimetic compound of the following structural formula

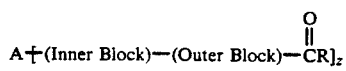

wherein A is an initiator moiety derived from an active hydrogen-containing initiator having at least 1 active hydrogen, IB is a hydrophilic polyoxyalkylene inner block having a

molar ratio molar ratio of less than 2.5, outer block is a lipophilic polyoxyalkylene outer block having an ester linkage to $$\overset{O}{\underset{\|}{-CR}}$$

which is substantially resistant to hydrolysis upon ingestion and having a $$\frac{\text{carbon}}{\text{oxygen}}$$

molar ratio of greater than 2.5, R is a $C_7$-$C_{23}$ hydrocarbon radical, and z corresponds to the number of active hydrogens on the active hydrogen-containing initiator.

The invention also provides a food composition having an edible oil component with reduced calorie availability wherein the edible oil component comprises an amount of an esterified polyoxyalkylene block copolymer of the structural formula given above effective to reduce the caloric content of the food composition as compared to a food composition containing a conventional triglyceride lipid.

The esterified polyoxyalkylene block copolymers of this invention are substantially non-digestible, non-absorbable, and non-toxic upon ingestion and exhibit physical and functional properties which are similar to conventional edible lipids. The instant fat mimetics are thermally stable and thus are suitable for use at elevated temperatures in applications such as frying and cooking. Most importantly, the fat substitutes of this invention have been found to unexpectedly increase greatly in viscosity upon mixing with minor amounts of water. Upon ingestion and contact with saliva and digestive juices, the esterified polyoxyalkylene block copolymers will tend to thicken or gel. more intimate mixing or association with the other components of the food composition will result, thereby reducing or preventing separation of the fat mimetic. Because of these unique properties, anal leakage problems are minimized and bowel transit times are not significantly affected when the fat mimetics of this invention are employed. The addition of anti-anal leakage agents to the food composition is therefore not necessary.

DETAILED DESCRIPTION OF THE INVENTION

The esterified polyoxyalkylene block copolymers of this invention are comprised of four types of covalently bonded moieties, namely, (1) an initiator moiety A, (2) a hydrophilic polyoxyalkylene inner block (3) a lipophilic polyoxyalkylene outer block and (4) an acyl group $$\overset{O}{\underset{\|}{-CR.}}$$

The presence of both a hydrophilic polyoxyalkylene inner block and a lipophilic polyoxyalkylene outer block is critical to the desirable performance characteristics of the fat mimetics of this invention. Without wishing to be bound by theory, the inner block apparently helps to promote the viscosity increase observed upon mixing the fat mimetic with water. Analogous esterified polyoxyalkylene polymers lacking a hydrophilic inner block do not exhibit a similar increase in viscosity. The presence of a lipophilic outer block is similarly essential as it renders the esterified polyoxyalkylene block copolymer more oil-like in properties than an analogous material containing only a hydrophilic inner block. An esterified polyoxyethylene polymer, which does not contain a lipophilic outer block, is highly susceptible to enzymatic hydrolysis upon ingestion due to the high proportion of primary ester linkages. Consequently, such substances will be much more readily digested and will have a significantly higher degree of caloric availability than the fat mimetics of this invention.

The initiator moiety A is derived from an active hydrogen-containing initiator having at least 1 active hydrogen group. Preferably, the number of active hydrogen groups is from 1 to 8 (and most preferably is 2 or 3) and the active hydrogen-containing initiator is an alcohol. However, other types of active hydrogen-containing initiators such as primary or secondary amines are also suitable for use. Suitable alcohol initiators include, for example, monols, diols, triols, tetrols, saccharides, and sugar alcohols. Examples of preferred monols include aliphatic and aromatic alcohols such as methanol, ethanol, n-propanol, 2-propanol, and $C_4$-$C_{24}$ straight chain or branched aliphatic alcohols as well as phenol and substituted phenols such as cresol. Suitable diols are compounds having two hydroxyl groups, including, but not limited to, 1,2-glycols such as ethylene glycol and propylene glycol as well as dihydroxyl compounds such as 1,3-propanediol, 2,2-dimethyl-1,3-propanediol, 1,4-butanediol, 1,5-pentanediol, diethylene glycol, tripropylene glycol, 2,4-pentanediol, pinacol, and the like. Specific examples of preferred triols (compounds having three hydroxyl groups) include, but are not limited to, glycerin, trimethylol propane, trihydroxybutane, trihydroxypentane, trihydroxyhexane, and their mixtures. Pentaerythritol and erythritol are examples of suitable tetrol initiators. Suitable saccharides include, for example, glucose, fructose, mannose, galactose, arabinose, xylose, sorbose, sucrose, and the like. Also suitable are the sugar alcohols corresponding to the general formula $HOCH_2(CHOH)_nCH_2OH$, where $n=2-6$. The preferred initiator is glycerin.

Aliphatic or aromatic amines may alternatively be employed as initiators, provided at least one active hydrogen is present. Suitable amines include the amino analogs of the alcohol initiators described herein. Aliphatic diamines such as ethylenediamine are particularly preferred. Mixtures of alcohol and amine initiators may be employed if desired. Alternatively, the initiator may contain both an amino and a hydroxy group. Polymeric active hydrogen-containing initiators such as oligosaccharides, polysaccharides, polyvinyl alcohol, partially hydrolyzed polyvinyl acetate, polyglycerols, celluloses, and the like are also suitable for use.

The hydrophilic polyoxyalkylene inner block is a segment of alkylene oxide repeating units having an affinity for water. That is, the inner block would have high solubility in water if it were to be separated from the other component segments of the esterified polyoxyalkylene block copolymer. For this reason, the $$\frac{\text{carbon}}{\text{oxygen}}$$

molar ratio in the inner block must be less than 2.5. The inner block is preferably comprised of oxyethylene repeating units derived from ethylene oxide, but may contain other types of oxyalkylene repeating units. Preferably, no less than 75 mole percent of the oxyalkylene repeating units are oxyethylene repeating units. In general, it is preferred that the other oxyalkylene repeating units be derived from epoxides containing no more than four carbon atoms since epoxides having a greater number of carbon atoms will tend to decrease the desired hydrophilic character of the inner block. Epoxides such as propylene oxide, 1,2-butene oxide, 2,3-butene oxide, and isobutylene oxide are therefore most preferred for use as the comonomer epoxide. Preferably, the ethylene oxide and comonomer epoxide repeating units are arranged randomly in the structure of the inner block. However, it is also possible to have sub-blocks within the inner block. For example, the inner block may contain a sub-block of ethylene oxide and a sub-block of another epoxide provided that minimum hydrophilicity requirement of the entire inner block is met. The equivalent weight of the inner block is preferably from about 88 to 1540. If the inner block is comprised of oxyethylene repeating units, it is preferred that the number of such repeating units per inner block segment be from about 2 to 35.

The lipophilic polyoxyalkylene outer block is a segment of polymerized alkylene oxide repeating units having a lower affinity for water than the inner block. That is, the outer block would have lower solubility in water and higher solubility in a hydrocarbon solvent than the inner block if it were to be separated from the other component moieties of the esterified polyoxyalkylene block copolymer. The outer block is preferably comprised of oxyalkylene repeating units derived from epoxides having three or more carbon atoms. To maintain a suitable lipophilic character, the $$\frac{carbon}{oxygen}$$

molar ratio in the outer block must be greater than 2.5. Preferably, the outer block contains no more than about 25 mole percent of oxyethylene repeating units; preferably, the oxyethylene repeating units are randomly interspersed in the outer block. However, it is also possible to have sub-blocks within the outer block. For example, the outer block may have a sub-block of propylene oxide and sub-block of 1,2-butene oxide or other epoxide. The minimum lipophilicity requirement for the outer block must still be met. The lipophilic polyoxyalkylene outer block is preferably derived from one or more $C_3$–$C_{10}$ epoxides. Although propylene oxide is the most preferred epoxide for this purpose, other epoxides such as 1,2-butene oxide, 2,3-butene oxide, isobutylene oxide, 1,2-pentene oxide, 1,2-hexene oxide, 1,2-heptene oxide, 1,2-octene oxide, phenyl glycidyl ether, cyclohexene oxide, cyclopentene oxide, methyl glycidyl ether, styrene oxide, allyl glycidyl ether, and ethyl glycidyl ether, as well as mixtures of these epoxides may also be employed. In a preferred embodiment of this invention, the outer block is comprised of at least about 75 mole percent oxypropylene repeating units. The equivalent weight of the outer block is preferably from about 110 to 2030. If the outer block is comprised of oxypropylene repeating units, it is preferred that the number of such repeating units per outer block segment be from about 2 to 35.

The acyl group

in the esterified polyoxyalkylene block copolymer has an R group which is a $C_7$–$C_{23}$ hydrocarbon moiety (more preferably, a $C_{11}$–$C_{21}$ hydrocarbon moiety). Preferably, this moiety is paraffinic or olefinic in structure. Most preferably, the acyl group is derived from a fatty acid. Any of the known natural or synthetic fatty acids may be used, including, for example, caprylic, capric, lauric, myristic, myristoleic, stearic, palmitic, palmitoleic, rincinoleic, linoleic, linolenic, elaeostearic, arachidic, behenic, erucic, oleic, and heptadecanoic acid. The physical properties of the esterified polyoxyalkylene block copolymers may be varied as desired by changing the length and structure of hydrocarbon group R; products which are liquid oils, fats, greases, or solid waxes may thus be obtained. The fatty acid chain length is also believed to contribute to the non-digestible properties of the esterified polyoxyalkylene block copolymer by making the compound non-absorbable in the digestive tract. The fatty acids can be either synthetic or naturally occurring fatty acids and may be either saturated or unsaturated. For example, rapeseed oil provides a good source for $C_{22}$ acid ($R=C_{21}$). $C_{16}$-$C_{18}$ fatty acids ($R=C_{,15-17}$) can be obtained from tallow, soybean oil, or cottonseed oil. Shorter chain fatty acids can be provided by coconut, palm kernel oil, or babassu oils. Corn oil, fish oil lard, olive oil, palm oil, peanut oil, safflower seed oil, sesame seed oil, jojoba oil and sunflower seed oil are examples of other natural oils which can serve as the source of the fatty acid component. Among the fatty acids, those that are preferred have from about 14 to about 22 carbon atoms ($R=C_{13-21}$), and are most preferably selected from the group consisting of myristic, palmitic, stearic, oleic, behenic, and linoleic. The preferred sources for the fatty acid components are natural fats and oils which have a high content of these fatty acids, e.g., soybean oil, rapeseed oil, olive oil, cottonseed oil, corn oil, tallow and lard.

It is critical that the ester linkage between the lipophilic polyoxyalkylene outer block and the acyl group

be substantially resistant to hydrolysis upon ingestion. The esterified polyoxyalkylene block copolymer is thereby rendered non-digestible and suitable for use as a reduced calorie replacement for conventional triglyceride oils and fats which are hydrolyzed and digested upon ingestion. "Substantially resistant to hydrolysis" in this context means that a substance has an in vitro lipase hydrolysis rate value using porcine pancreatic lipase which is less than about 30% of the value of an olive oil standard. Preferably, the hydrolysis rate value is less than about 10% of the olive oil value. The experimental procedure for determining the in vitro lipase hydrolysis rate is described in U.S. Pat. No. 4,861,613, the teachings of which are incorporated herein by reference.

To render the esterified polyoxyalkylene block copolymer substantially resistant to hydrolysis in the digestive tract, the carbon connected to the ester group

should be from about 85 to 100% secondary and/or tertiary on average. In other words, this carbon should be no greater than about 15 percent primary on average. This key structural feature may be achieved by the use of an outer block having predominantly secondary and/or tertiary hydroxyl groups prior to formation of the ester linkage to $$\overset{O}{\underset{\|}{-CR.}}$$

The esterified polyoxyalkylene block copolymers of this invention may be prepared using any appropriate synthetic method. One such method involves first alkoxylating a starting active hydrogen-containing initiator such as a diol, triol, tetrol, saccharide, sugar alcohol, or primary or secondary amine with the desired number of equivalents of a first epoxide (or mixture of epoxides) to form the inner block and then reacting the alkoxylated intermediate thus formed with the desired amount of a second epoxide (or mixture of epoxides) to form the outer block. The hydroxy groups of the A $+$(inner block)—(outer block $+$H])$_z$ intermediate are subsequently esterified using one or more fatty acids or fatty acid derivatives.

The alkoxylation steps are preferably performed under base-catalyzed conditions using, for example, an alkali metal catalyst such as potassium hydroxide, sodium methoxide, sodium hydride, sodium metal dispersion or the like. This approach has the advantage of forming predominantly secondary or tertiary hydroxy end-groups on the alkoxylated initiator intermediate, since nucleophilic attack of the alkoxide end-group of the alkoxylated initiator intermediate tends to occur at the least substituted carbon of the epoxide. For example, base-catalyzed alkoxylation of glycerin initiator using propylene oxide as the epoxide gives about 98% secondary and only about 2% primary hydroxyl end-groups [Gibson, et al. *J. Appl. Polymer Sci.* 14, 1059 (1970)]. As mentioned previously, it is important that the carbon which is ultimately attached to the ester group in the final product (corresponding to the terminal carbon of the alkoxylated initiator intermediate) be at least about 85 percent secondary and/or tertiary on average to render the fat mimetic substantially nondigestible. For this reason, if a minor amount of oxyethylene repeating units are desired in the outer block, the ethylene oxide should be introduced in a manner such that substantially all of it is reacted prior to complete consumption of all of the other epoxide (e.g., propylene oxide).

The esterification of the intermediate alkoxylated initiator may be accomplished using any suitable method known for synthetic transformations of this type. For example, a fatty acid or mixture of fatty acids may be reacted with the alkoxylated polyol to yield the esterified polyoxyalkylene block copolymer and water as a co-product. A catalyst may be used to accelerate the reaction, preferably an acidic catalyst such as a mineral acid (sulfuric acid, for example) or a sulphonic acid (p-toluene sulphonic acid, for example). Alternatively, a transesterification reaction may be employed wherein a fatty acid ester $$\overset{O}{\underset{\|}{[R'OCR]}}$$

or mixture of fatty acid esters is reacted with the alkoxylated polyol. Preferably, the fatty acid ester contains a $C_1$-$C_6$ alkoxy moiety (R'=$CH_3$, for example) The low boiling alcohol formed as a co-product may be removed from the transesterification reaction mixture in order to drive the equilibrium reaction to completion in the desired direction. A catalyst may be used in the transesterification. In yet another approach, the alkoxylated polyol may be reacted with an acid halide derivative of one or more fatty acids $$\overset{O}{\underset{\|}{[XCR,}}$$

where X=Cl, Br, etc. A base such as a tertiary amine may be added to remove the HX generated.

It should be understood that by the nature of the chemical reactions used to prepare the esterified polyoxyalkylene block copolymers, the products obtained will generally be mixtures of individual compounds which have a range of molecular weights and which may contain structural isomers. It may be useful to deliberately blend individually prepared esterified polyoxyalkylene block copolymers having different degrees of alkoxylation, different functionality (varying values of z) and/or different R substituents in order to obtain fat mimetics having certain desired properties.

A convenient method for the preparation of the esterified polyoxyalkylene block copolymers of this invention is to esterify an ethylene oxide-propylene oxide block copolymer of the type sold commercially for use as nonionic surface active agents. Any of these types of block copolymers are suitable for use provided that the ethylene oxide block is at the interior of the polymer chain and the propylene oxide block(s) are on the outside of the molecule. The "Pluronic R" and "Tetronic R" surfactants available from BASF Corporation are examples of suitable block copolymers of this type. The "Pluronic R" series of surfactants, which have a central polyoxyethylene block and two terminal polyoxypropylene blocks, contain from about 10 to 80 weight percent ethylene oxide and from about 20 to 90 weight percent propylene oxide overall. The equivalent weight of each polyoxypropylene block ranges from abut 550 to 1550. The "Tetronic R" series of surfactants employ ethylenediamine as the active hydrogen-containing initiator and consequently have four polyoxyethylene inner blocks and four polyoxypropylene outer blocks. These surfactants contain from 10 to 80 weight percent polyoxyethylene and from 20 to 90 weight percent polyoxypropylene. The equivalent weight of each outer block is from about 525 to 1675.

The composition of the intermediate alkoxylated initiator is preferably selected such that the hydrophilic-to-lipophilic balance (HLB) value is from about 1 to 30. Methods of determining HLB value are well known and are described, for example, in Becher et al. *J. Am. Oil Chemists Soc.* 41, 169(1964).

The esterified polyoxyalkylene block copolymers of this invention may be used as a partial or total replacement for a conventional lipid in any edible fat-containing food composition. The amount of the fat mimetic is sufficient to effectively reduce the available calories of the food composition compared to a food composition prepared using a conventional fully digestible triglyceride lipid. Preferably, at least about 10 percent (more preferably, at least about 25 percent) of the edible oil component of the composition is comprised of the esterified polyoxyalkylene block copolymer. The fat substitute of this invention can replace a triglyceride lipid in a cooking oil, frying oil, salad oil, or shortening, for example. Additional uses include combining the esterified alkoxylated block copolymer with other ingredients to form food compositions such as cakes, breads, ice cream, candy, mayonnaise, margarine, cheese and cheese spreads, cold cuts, potato chips, and the like.

Illustrative ingredients which may be used in combination with the fat mimetics of this invention include carbohydrates (starches, sugars, celluloses), edible lipids (triglycerides), proteins (from animal or vegetable sources), vitamins antioxidants, emulsifiers, thickeners, preservatives, colorants, flavors, fragrances, sugar substitutes, water, milk, spices, eggs, and the like. The instant esterified polyoxyalkylene block copolymers of this invention are particularly suitable for the preparation of food compositions requiring exposure to elevated temperatures. Unlike other proposed fat substitutes such as proteinaceous macrocolloids or unesterified polyoxyalkylene polyols, the fat mimetics of this invention are exceptionally stable thermally and do not readily decompose or lose their fat-like properties when heated.

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the fat mimetics and food compositions of this invention, but are not limitative of the invention in any manner whatsoever.

EXAMPLE 1

An esterified polyoxyalkylene block copolymer was prepared by heating 1800 parts by weight "Pluracol 12R3" block copolymer with excess oleic acid at 2400° C. under nitrogen pressure (25 torr) for over 15 hours. "Pluracol 12R3" is an ethylene oxide-propylene oxide block copolymer sold by the BASF Corporation which contains about 30 weight (36 mole) percent polyoxyethylene. The equivalent weight of each of the two polyoxypropylene end blocks is about 600. The structure of "Pluracol 12R3" may be represented as follows:

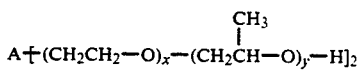

wherein A is a difunctional alkoxy moiety, (i.e., —OCH$_2$CH$_2$O—), x is about 6 on average, and y is about 10 on average.

The unreacted fatty acid was removed by vacuum steam stripping at 1 mm and 240° C., yielding a clear light yellow liquid having the characteristic physical properties of a conventional triglyceride oil but which is expected to be substantially resistant to hydrolysis upon ingestion. The esterified polyoxyalkylene block copolymer product was comprised predominantly of the compound

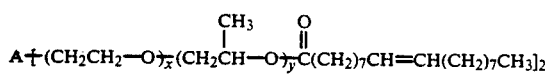

wherein A is a difunctional alkoxy moiety, x is about 6 on average, and y is about 10 on average.

To demonstrate the advantageous interaction of the fat mimetics of this invention with water, the viscosity of the esterified polyoxyalkylene block copolymer was measured before and after admixing 10 weight percent water with the block copolymer. The viscosity data thus obtained are shown in Table I; viscosities were measured using a Brookfield LV viscometer.

TABLE I

| Temp. | Spindle | Viscosity (cps) | |
| --- | --- | --- | --- |
| (°C.) | Speed (rpm) | Neat | 10% Water |
| 26 | 6 | 350 | 580 |
|  | 60 | 198 | 421 |
| 40 | 6 | 115 | 320 |
|  | 60 | 110 | 148 |

These results show that the viscosity of the esterified polyoxyalkylene block copolymer increases significantly when mixed with a minor amount of water. A similar increase in viscosity is not observed, however, when water is added to an analogous esterified polyoxyalkylene polyol containing polyoxypropylene repeating units but no polyoxyethylene repeating units.

EXAMPLE 2

An esterified polyoxyalkylene block copolymer was prepared using the procedure described in Example 1 and "Pluracol 31R4" in place of "Pluracol 12R3". "Pluracol 31R4" is an ethylene oxide-propylene oxide block copolymer sold by the BASF Corporation which contains about 40 weight (47 mole) percent polyoxyethylene. The equivalent weight of each of the two polyoxypropylene end blocks is about 1550. The structure of "Pluracol 31R4" may be represented as follows:

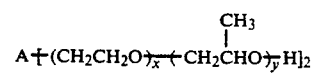

wherein A is a difunctional alkoxy moiety (i.e., —OCH$_2$CH$_2$O—), x is about 24 on average, and y is about 27 on average.

The esterified polyoxyalkylene block thus obtained was a clear oil resembling a conventional digestible triglyceride oil in skin feel and consistency. The major portion of the product had the structure

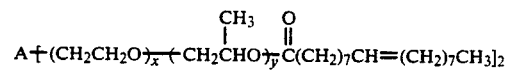

wherein A is a difunctional alkoxy moiety, x is about 24 on average, and y is about 27 on average.

The viscosity of the esterified polyoxyalkylene block copolymer increased substantially when admixed with 10 weight percent water, as shown in Table II. The increases in viscosity were observed both at room temperature and at a slightly elevated temperature close to a normal body temperature of 37° C.

TABLE II

| Temp. | Spindle | Viscosity (cps) | |
| --- | --- | --- | --- |
| (°C.) | Speed (rpm) | Neat | 10% Water |
| 26 | 6 | 380 | 3500 |
|  | 12 | 215 | 3450 |
| 40 | 6 | 260 | 800 |
|  | 12 | 125 | 768 |

EXAMPLE 3

Example 1 was repeated using "Pluracol 25R4" instead of "Pluracol 12R3". "Pluracol 25R4" is an ethylene oxide-propylene oxide block copolymer sold by the BASF Corporation which contains about 40 weight percent polyoxethylene. The equivalent weight of each of the two polyoxypropylene end blocks is about 1250.

The esterified polyoxyalkylene block copolymer produced was a clear oil having good oil-like organoleptic characteristics. The product was comprised predominantly of

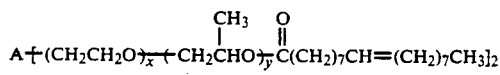

wherein A is a difunctional alkoxy moiety (i.e, —OCH$_2$CH$_2$O—), x is about 19 on average, and y is about 22 on average.

A substantial increase in viscosity occurred upon mixing 10 weight percent water with the esterified polyoxyalkylene block copolymer (Table III), suggesting that the product will have less tendency than other fat substitutes to promote anal leakage or short bowel transit time upon ingestion.

TABLE III

| Temp. (°C.) | Spindle Speed (rpm) | Viscosity (cps) Neat | Viscosity (cps) 10% Water |
| --- | --- | --- | --- |
| 26 | 6 | 350 | 1400 |
|  | 12 | 233 | 1335 |
| 40 | 6 | 300 | 600 |
|  | 12 | 175 | 475 |

EXAMPLE 4

This example demonstrates the preparation of an esterified polyoxyalkylene block copolymer using glycerin as the active hydrogen-containing initiator and soybean fatty acids.

Glycerin (920 parts) is heated with potassium hydroxide (25 parts) at 1100° C. under 25 torr pressure for 1 hr. Ethylene oxide (4400 parts) is added at 110° C. on a pressure demand basis. After the addition is complete, the mixture is heated at 1100° C. for an additional 4 hr. to completely polymerize the ethylene oxide. Propylene oxide (5800 parts) is then added at 110° C. on a pressure demand basis. When the propylene oxide has completely reacted, the alkoxylated initiator intermediate is heated with magnesium silicate (150 parts) at 900° C. for 1 hr. and then filtered to remove the residual potassium and magnesium silicate.

The alkoxylated initiator intermediate (1000 parts) is heated with excess soybean fatty acids (1140 parts) under the conditions of Example 1. The unreacted fatty acid is removed by vacuum steam distillation at 240° C. (1 mm). The resulting product is expected to be a clear oil having the physical appearance, odor, and taste of soybean oil and exhibiting a significant increase in viscosity when mixed with water.

The structure of the esterified polyoxyalkylene block copolymer produced is

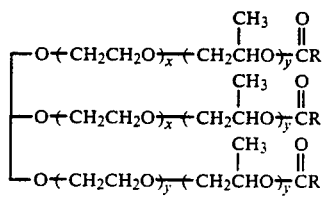

wherein x and y are each about 3.3 on average and

is an acyl moiety derived from the soybean fatty acids.

EXAMPLE 5

The preparation of an esterified polyoxyalkylene block copolymer using sorbitol as the active hydrogen-containing initiator and a mixture of fatty acids is illustrated by this example.

Sorbitol (180 parts) is heated with potassium hydroxide (5 parts) at 110° C. under nitrogen at 25 mm pressure. Ethylene oxide (528 parts) and propylene oxide (696 parts) are then reacted sequentially with the sorbitol to yield an alkoxylated sorbitol intermediate. The residual catalyst is removed by heating with magnesium silicate.

The alkoxylated sorbitol intermediate (1000 parts) is heated with a 1:2 mixture of stearic and oleic acid (800 parts) at 240° C. under nitrogen with continuous removal of water. When the hydroxyl conversion is 95 percent or higher, the excess unreacted fatty acid is removed by vacuum steam stripping at 240° C. (1 mm). The esterified polyoxyalkylene block copolymer obtained has the general structure

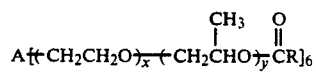

wherein A is a hexafunctional alkoxy moiety derived from the sorbitol, x is about 2 on average, y is about 2 on average, and R is either —(CH$_2$)$_7$CH=CH(CH$_2$)$_7$(CH$_3$ or —(CH$_2$)$_{16}$CH$_3$.

EXAMPLE 6

This example demonstrates the preparation of an esterified polyoxyalkylene block copolymer using dodecanol as the active hydrogen-containing initiator.

Dodecanol (186 parts) is heated with potassium hydroxide (5 parts) at 110° C. under nitrogen at 25 mm pressure. A mixture of ethylene oxide (176 parts) and propylene oxide (58 parts) is then added on a pressure demand basis. The mixture is heated for 3 hours at 110° C. to react all of the epoxide before starting the addition of propylene oxide (290 parts) on a pressure demand basis. When all of the propylene oxide is completely reacted, the alkoxylated dodecanol intermediate is treated with magnesium silicate and filtered to remove the potassium catalyst.

The alkoxylated dodecanol intermediate (709 parts) is esterified with excess peanut oil fatty acids (340 parts) using the conditions of Example 1, yielding an esterified polyoxyalkylene block copolymer having the structure

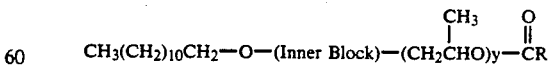

wherein inner block is an inner block of ca. 234 equivalent weight containing both oxyethylene and oxypropylene repeating units in a 4:1 molar ratio $$\left(\frac{carbon}{oxygen} = 2.2\right),$$

y is about 5 on average, and $$\overset{O}{\underset{}{\|}}\\-CR$$

is an acyl group derived from the peanut oil fatty acids.

EXAMPLE 7

This example demonstrates the preparation of an esterified polyoxyalkylene block copolymer using erythritol as the active hydrogen containing initiator.

Erythritol (122 parts) is heated with potassium hydroxide (10 parts) at 110° C. under nitrogen at 25 mm pressure. Ethylene oxide (880 parts) is added at 110° C. on a pressure demand basis. After continued heating at 110° C. to react all of the ethylene oxide, a mixture of 50 mole percent propylene oxide (232 parts) and 50 mole percent 1,2-butene oxide (288 parts) is added on a pressure demand basis. When all of the propylene oxide and 1,2-butene oxide are completely consumed, the alkoxylated erythritol intermediate is treated with magnesium silicate to remove the residual alkali metal catalyst.

To form the esterified polyoxyalkylene block copolymer, the alkoxylated erythritol intermediate (1522 parts) is reacted with methyl oleate (325 parts) and potassium methoxide catalyst (10 parts) for 3 hours at 150° C. while removing methanol continuously. The product is purified by heating with magnesium silicate (50 parts) for 2 hours at 90° C., filtering, and then removing the excess methyl oleate by vacuum steam stripping. The esterified polyoxyalkylene product thus obtained is expected to be oil-like in appearance and physical properties, substantially resistant to hydrolysis and absorption upon ingestion, and capable of thickening when mixed with minor amounts of water. The structure of the product is as follows:

$$A\text{+}CH_2CH_2O\text{+}_{\overline{x}}(\text{Outer Block})-\overset{O}{\underset{}{\|}}C(CH_2)_7CH=CH(CH_2)_7CH_3]_4$$

wherein A is a tetrafunctional alkoxy moiety derived from the erythritol

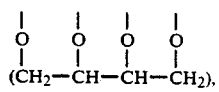

x is about 5 on average, and outer block is a lipophilic outer block of about 130 equivalent weight containing approximately equimolar amounts of oxypropylene and oxybutylene repeating units $$\left(\frac{\text{carbon}}{\text{oxygen}}=3.5\right).$$

EXAMPLE 8

The preparation of an esterified polyoxyalkylene block copolymer containing an initiator moiety derived from ethylene diamine is illustrated by this example.

"Tetronic 90R4" (7240 parts; an ethylene oxide-propylene oxide block copolymer surfactant sold by the BASF Corporation and produced by the sequential addition of ethylene oxide and propylene oxide to ethylene diamine) is reacted with soya acid methyl ester (1780 parts; available from Emery Chemicals) using the procedure described in Example 7. The structure of the esterified polyoxyalkylene block copolymer thus produced is $$A\text{+}(CH_2CH_2O)_{\overline{x}}\text{+}(CH_2CHO)_{\overline{y}}\overset{CH_3}{\underset{}{\diagdown}}\overset{O}{\underset{}{\|}}CR]_4$$

wherein A is an initiator moiety derived from ethylenediamine i.e,

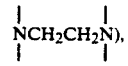

x is about 16–17 on average, y is about 18–19 on average, and $$\overset{O}{\underset{}{\|}}\\-CR$$

is derived from the soya acid methyl ester.

EXAMPLE 9

This example demonstrates the preparation of reduced calorie french fries using the esterified polyoxyalkylene block copolymer of this invention.

Potatoes are pared and then cut lengthwise in strips approximately ⅜ inch in width. The esterified polyoxyalkylene block copolymer of Example 1 is heated to 360° F. in a suitable deep-fat cooking vessel; sufficient block copolymer is employed to provide a layer at least about 2 inches deep in the vessel. The cut potato strips are then placed in the hot block copolymer for 6 to 7 minutes or until crisp and golden. Drain on paper towels and sprinkle with salt.

The french fries thus prepared are expected to be similar in taste, odor, and appearance to french fries prepared using a conventional triglyceride oil. However, their available caloric content is significantly reduced owing to the substantially non-digestible and non-absorbable character of the esterified polyoxyalkylene block copolymer.

EXAMPLE 10

The preparation of a carrot-pineapple cake using the esterified polyoxyalkylene block copolymer of this invention is illustrated by this example.

Sifted all-purpose flour (1½ cups), sugar (1 cup), baking powder (1 tsp.), baking soda (1 tsp.), ground cinnamon (1 tsp.), and salt (½ tsp.) are sifted together in a bowl. The esterified polyoxyalkylene block copolymer of Example 2 (⅜ cup), eggs (2), finely shredded carrot (1 cup), crushed pineapple with syrup (½ cup), and vanilla (1 tsp.) are then added and mixed until moistened. The mixture is beaten 2 minutes at medium speed using an electric mixer, placed in a greased and floured 9×9×2 inch pan, and baked at 350° F. for 35 minutes or until done. Cool 10 minutes and remove from pan. The cake thus prepared is expected to be similar in taste, odor, appearance, and texture to a cake prepared using soybean oil instead of the esterified polyoxyalkylene block copolymer, yet is substantially lower in available calorie content due to the hydrolysis- and absorption-resistance of the fat mimetic.

I claim:

1. A food composition comprised of an edible oil component with reduced caloric availability and a food ingredient selected from carbohydrates, proteins, and vitamins, wherein the edible oil component comprises an amount of an esterified polyoxyalkylene block copolymer effective to reduce the caloric content of the food composition, the esterified polyoxyalkylene block copolymer having the structural formula:

wherein A is an alkoxy moiety derived from an alcohol having 2 or 3 hydroxyl groups, Inner Block is a hydrophilic polyoxyalkylene inner block comprised of oxyalkylene repeating units wherein at least 75 mole percent of said oxyalkylene repeating units are oxyethylene repeating units, Outer Block is a lipophilic polyoxylkylene outer block comprised of oxyalkylene repeating units derived from one or more $C_3$-$C_{10}$ epoxides and not more than 25 mole percent oxyethylene repeating units and having an ester linkage to

which has an in vitro lipase hydrolysis rate value using porcine pancreatic lipase which is less than about 30% of the value of an olive oil standard, R is a $c_7$14 $C_{23}$ hydrocarbon moiety, and Z corresponds to the number of hydroxyl groups on the alcohol.

2. The food composition of claim 1 wherein Inner Block consists of oxyethylene repeating units.

3. The food composition of claim 1 wherein Outer Block consists of oxypropylene repeating units.

4. The food composition of claim 1 wherein

is derived from a fatty acid.

5. The food composition of claim 1 wherein A is glyceryl and Z is 3.

6. A food composition comprised of an edible oil component with reduced caloric availability and a food ingredient selected from carbohydrates, proteins, and vitamins wherein from 10 to 100% of the edible oil component is comprised of an esterified polyoxyalkylene block copolymer having the structural formula:

wherein A is glyceryl, Inner Block is a hydrophilic polyoxyethylene inner block, Outer Block is a lipophilic polyoxypropylene outer block having an ester linkage to

which has an in vitro lipase hydrolysis rate value using porcine pancreatic lipase which is less than about 10% of the value of an olive oil standard, R is a $C_{11}$-$C_{23}$ paraffinic or olefinic hydrocarbon moiety, and Z is 3.

7. The food composition of claim 6 wherein the equivalent weight of Inner Block is from about 88 to 1540 and the equivalent weight of Outer Block is from about 110 to 2030.

8. The food composition of claim 6 wherein

is derived from a fatty acid.

9. A food composition comprised of an edible oil component with reduced caloric availability and a food ingredient selected from carbohydrates, proteins, and vitamins, wherein from 25 to 100% of the edible oil component is comprised of an esterified polyoxyalkylene block copolymer having the structural formula:

wherein A is glyceryl, x and y are each independently from about 2 to 35, R is a $C_{11}$-$C_{23}$ paraffinic or olefinic hydrocarbon moiety,

is derived from a fatty acid having an ester linkage to

which has an in vitro lipase hydrolysis rate value using porcine pancreatic lipase which is less than about 30% of the value of an olive oil standard, and Z is 3.

10. An edible oil component suitable for use in the preparation of a reduced calorie food composition, said edible oil component comprising a triglyceride and an esterified polyoxyalkylene block copolymer having the structural formula

wherein A is an alkoxy moiety derived from an alcohol having 2 or 3 hydroxyl groups, Inner Block is a hydrophilic polyoxyalkylene inner block comprised of oxyalkylene repeating units wherein at least 75 mole percent of said oxyalkylene repeating units are oxyethylene units, Outer Block is a lipophilic polyoxyalkylene outer block comprised of oxyalkylene repeating units derived from one or more $C_3$-$C_{10}$ epoxides and not more than 25 mole percent oxyethylene repeating units and having an ester linkage to

which has an in vitro lipase hydrolysis rate value using porcine pancreatic lipase which is less than about 30% of the value of an olive oil standard, R is a $C_7$-$C_{23}$ hydrocarbon moiety, and Z corresponds to the number of hydroxyl groups on the alcohol.

11. An edible oil component suitable for use in the preparation of a reduced calorie food composition, said edible oil component comprising a triglyceride and an esterified polyoxyalkylene block copolymer having the structural formula $$A[(\text{Inner Block})(\text{Outer Block})-\overset{\overset{\text{O}}{\|}}{C}R]_z$$

wherein A is glyceryl, Inner Block is a hydrophilic polyoxyethylene inner block, Outer Block is a lipophilic polyoxypropylene outer block having an ester linkage to $$-\overset{\overset{\text{O}}{\|}}{C}R$$

which has an in vitro lipase hydrolysis rate value using procine pancreatic lipease which is less than about 10% of the value of an olive oil standard, R is a $C_{11}$–$C_{23}$ paraffinic or olefinic hydrocarbon moiety, and Z is 3.

12. A method of reducing the tendency of a food composition comprised of a fat substitute to promote anal leakage, said method comprising using as the fat substitute an esterified polyoxyalkylene block copolymer having the structural formula $$A[(\text{Inner Block})(\text{Outer Block})-\overset{\overset{\text{O}}{\|}}{C}R]_z$$

wherein A is an alkoxy moiety derived from an alcohol having 2 or 3 hydroxyl groups, Inner Block is a hydrophilic polyoxyalkylene inner block comprised of oxyalkylene repeating units wherein at least 75 mole percent of said oxyalkylene repeating units are oxyethylene units, Outer Block is a lipophilic polyoxyalkylene outer block comprised of oxyalkylene repeating units derived from one or more $C_3$–$C_{10}$ epoxides and not more than 25 mole percent oxyethylene repeating units and having an ester linkage to $$-\overset{\overset{\text{O}}{\|}}{C}R$$

which has an in vitro lipase hydrolysis rate value using porcine pancreatic lipase which is less than about 30% of the value of an olive oil standard, R is a $C_7$–$C_{23}$ hydrocarbon moiety, and z corresponds to the number of hydroxyl groups on the alcohol.

13. The method of claim 12 wherein the alcohol is glycerol.

14. The method of claim 12 wherein Inner Block consists of oxyethylene repeating units.

15. The method of claim 12 wherein Outer Block consists of oxypropylene repeating units.

16. The method of claim 12 wherein $$-\overset{\overset{\text{O}}{\|}}{C}R$$

is derived from a fatty acid.

17. The method of claim 12 wherein the equivalent weight of Inner Block is from about 88 to 1540 and the equivalent weight of Outer Block is from about 110 to 2030.

* * * * *

UNITED STATES PATENT AND TRADEMARK OFFICE
CERTIFICATE OF CORRECTION

PATENT NO. : 5,308,634
DATED : May 3, 1994
INVENTOR(S) : Charles F. Cooper

It is certified that error appears in the above-indentified patent and that said Letters Patent is hereby corrected as shown below:

Column 3, line 10, delete "$C_7-C_{23}$", insert in place thereof --$C_7-C_{23}$--.

Column 6, line 17, delete "$R=C_{,15-17}$,", insert in place thereof --$R=C_{15-17}$--.

Column 15, line 28, delete "$c_7^{14}C_{23}$", insert in place thereof --$C_7-C_{23}$--.

Signed and Sealed this

Twenty-third Day of August, 1994

Attest:

BRUCE LEHMAN

*Attesting Officer*      *Commissioner of Patents and Trademarks*